United States Patent [19]
Garrett

[11] Patent Number: 5,196,467

[45] Date of Patent: Mar. 23, 1993

[54] GLASS SIZE COMPOSITIONS, COATED GLASS FIBERS AND REINFORCED THERMOPLASTICS

[75] Inventor: David W. Garrett, Marietta, Ga.

[73] Assignee: Owens-Corning Fiberglas Corporation, Toledo, Ohio

[21] Appl. No.: 810,312

[22] Filed: Dec. 19, 1991

[51] Int. Cl.⁵ ............................................... C08K 5/15
[52] U.S. Cl. .................................. 524/114; 428/391; 428/383; 428/378; 428/405
[58] Field of Search ................ 524/114; 428/391, 383, 428/378, 405

[56] References Cited

U.S. PATENT DOCUMENTS 3,472,729 10/1969 Sterman et al. ..................... 524/114
3,513,003 10/1964 O'Brien ................................ 524/114

Primary Examiner—Paul R. Michl
Assistant Examiner—Sid Kalachandra
Attorney, Agent, or Firm—Patrick P. Pacella; Ted C. Gillespie

[57] ABSTRACT

Aqueous size compositions for glass fibers including melamine formaldehyde resins, phenoxy resins and epoxy coupling agents which are particularly suitable glass fiber reinforcements for thermoplastics. In particular, chopped glass fibers coated with the size are useful in reinforcing acetal composites.

15 Claims, No Drawings

GLASS SIZE COMPOSITIONS, COATED GLASS FIBERS AND REINFORCED THERMOPLASTICS

TECHNICAL FIELD

This invention relates to a size composition, coated glass fibers and reinforced thermoplastics. These sizes are particularly useful for reinforcing acetal resins.

BACKGROUND ART

Numerous thermoplastic materials are available including polyolefins, polyacetals, polyamides (nylons), polycarbonates, polystyrenes, styrene-acrylonitrile copolymers, acrylonitrile-butadiene styrene (ABS) copolymers and polyvinyl chloride (PVC). Thermoplastic resin and glass fibers are made into useful shapes by means of heat and pressure. Processes include injection of hot resin into a mold, extrusion and pultrusion. Other processes include hot calendaring, casting, vacuum forming and the like. Chopped glass fibers feed into these processes to strengthen and stiffen the resulting composite.

DISCLOSURE OF THE INVENTION

The invention includes a size comprising:
o melamine formaldehyde resin
o phenoxy resin
o epoxy silane coupling agent
The resulting coated glass fibers yield improved tensile strength of the glass fiber reinforced thermoplastics. I found an especially surprising effect on the composite tensile of acetal resins.

DESCRIPTION OF THE PREFERRED EMBODIMENTS

The glass size composition of the present invention is useful with filamentous glass which is well known to those skilled in the art. Various types of glass filaments, such as "E" glass and other known types of glass, can be sized with my size. The size is useful on glass filaments having a wide range of diameters and can be used on glass filaments whether or not they are gathered into fibers, ropes, rovings, yarns and the like.

The melamine formaldehyde resin I use is a compound with N-methylol function or $N-CH_2-OR$ function. It is a formaldehyde aminoplast resin, with or without ether, (polyoxyalkylation). Examples are melamineformaldehyde, urea-formaldehyde, amido-formaldehyde, or optionally, a aminoplast resin or a mixture of these resins whether copolymerized or not.

The phenoxy resin I use is any suitable water dispersible phenoxy resin. For example, the water dispersible phenoxy resin can be a carboxyl modified polyhydroxy ether. The phenoxy resins are described in U.S. Pat. No. 4,711,924. One particularly suitable water dispersible phenoxy resin is PKHW-35 commercially available from Union Carbide.

The coupling agent component of the aqueous sizing composition of the invention comprises organo-silanes, having a readily hydrolyzable bond to a silicon atom of the silane, or hydrolysis products thereof. The organo-silanes may have an epoxy, i.e., oxirane, group linked through non-hydrolyzable bonds to a silicon atom. The organo-silane also may have an acrylyl or methacrylyl group linked through non-hydrolyzable bonds to a silicon atom of the silane; preferably the acrylyl or methacrylyl group is a acrylyloxy or methacrylyloxy group. The organo-silanes include monosilanes containing the structure $R^1 Si(OR)_2$, where R and $R^1$ can be virtually any organic group, but lower alkyl groups such as methyl or ethyl are particularly convenient and satisfactory. An example of the organo-silane is a glycidoxy polymethylenetrialkoxysilane, such as 3-glycidoxy-1-propyltrimethoxysilane. Another example is an acryloxy-or methacrylyloxypolymethylenetrialkoxylsilane such as 3-methacrylyloxy-1-propyltrimethoxysilane. I prefer an organo-silane such as gamma-glycidoxypropyltrimethoxysilane available as A-187 from Union Carbide. Another suitable coupling agent is gamma-methacryloxypropyltrimethoxysilane, available as A-174 from Union Carbide.

The lubricant component of the aqueous sizing composition of this invention can be any normally liquid or solid lubricating material suitable for the purpose. Such materials include vegetable and mineral oils, waxes of various types and certain materials which also have utility as surfactants, such as fatty acid monoesters of polyalkyleneglycols. Other lubricants are ethoxylated fatty acids or di-acids, an ethoxylated nonylphenol, and an ethoxylated octylphenol.

The addition of an acid to the size is primarily for pH control. The amount of acid employed is sufficient to impart to the size a pH of 5.5 or less. However, the quantity of acid may be increased to impart to the size a pH within the range of from about 3 to about 4.

The components for this size are employed in conventional amounts.

Preferably, the size comprises by weight.

|  | Weight Percent |
| --- | --- |
| melamine formaldehyde resin | 0.5–14.0 |
| phenoxy resin | 1.0–33.0 |
| epoxy silane coupling agent | 0.1–3.5 |
| lubricant | 0.01–0.2 |
| acid | 0.001–0.1 |
| water | Balance |

The total solids content will preferable be from about 1 to about 25% and more preferable from about 3 to about 10%, by weight.

More preferably, the size comprises by weight.

|  | Weight Percent |
| --- | --- |
| melamine formaldehyde resin | 1.5–5.5 |
| phenoxy resin | 3.5–13.5 |
| epoxy silane coupling agent | 0.4–1.5 |
| lubricant | 0.02–0.1 |
| acid | 0.01–0.1 |
| water | Balance |

The aqueous sizing compositions of the invention can be prepared following generally accepted mixing practices. These sizing compositions can be applied to the glass fiber using any convenient method. The amount of aqueous sizing composition applied is not narrowly critical, but is preferably controlled so as to deposit on the glass fibers a size coating comprising the dried residue of the aqueous sizing composition of the invention in an amount from about 0.25 to about 2 percent of the weight of the glass, taking into account the dilution of the non-volatile components in the aqueous sizing composition and the usual mechanical loss of some of the aqueous composition initially applied to the fibers before it is dried.

The aqueous sizing composition can be applied to the glass fibers drawing the fibers over a roll, pad, or other suitable surface wet or flooded with the aqueous sizing composition, by spraying, by dipping, or by any other suitable means. The overall concentration of the non-volatile components in the aqueous sizing composition can be adjusted over a wide range according to the means of application to be employed, the character of the glass fibers to be sized, e.g. their diameter and composition, and the weight of dried size coating desired for the intended use of the sized fibers.

The sized glass fibers of the invention can be incorporated into the curable matrix resin which is to be reinforced thereby in the final cured resinous article as either monofilament or multi-filament strand, as either long, essentially continuous, elements or short chopped pieces, depending upon the shape and method of fabrication of the article to be formed. The sized glass fibers of this invention are particularly adapted for use in the form of chopped glass fibers. Principal among such reinforcements are glass fibers which generally have diameters of about 0.0025 to 0.0075 inch and lengths of about 0.13 to about 2.00 inch.

As stated earlier, this size is useful for reinforcing thermoplastic resins, but was found especially useful in acetal resins. This engineering plastic has many uses in the automotive, appliance and plumbing industries. Acetal resin polymerizes to form a polyoxymethylene thermoplastic with recurring units of —O—CH$_2$—O—CH$_2$—O—CH$_2$—.

EXAMPLE I

A preferred aqueous sizing composition has the following formulation:

|  | Weight Percent |
| --- | --- |
| methylated, melamine formaldehyde resin, American Cyanamid Cymel 373 | 4.6 |
| water dispersible phenoxy resin, Union Carbide PKHW-35 | 11.4 |
| gamma-glycidoxypropyltrimethoxy silane Union Carbide A-187 | 1.2 |
| polyoxyethylene (20) sorbitan lubricant, ICI America's Tween 65 | 0.07 |
| ammonium chloride | 0.12 |
| acetic acid | 0.025 |
| water | balance |

The aqueous solution has a solids content of 8.44 weight percent and a pH of 5.5 or less. The size was applied to individual glass fibers by conventional application methods and at rates such that the strand solids, on drying, amounted to about 2 weight percent.

Glass fibers comprising standard length chopped glass fibers having an average length of about 0.125 inches and from about 0.00035–0.00039 inch fiber diameter were produced from the strands.

EXAMPLE II

The molded mechanical properties of the sized fibers were evaluated and compared to a commercially available sample. The results of each test are shown below. The composite resin was an acetal resin from Celanese, Celcon M-90 C/360.

| Sample | A | B | C | D | Control | Control |
| --- | --- | --- | --- | --- | --- | --- |
| Extruder TEMP. (°F.) | 440 | 500 | 440 | 500 | 440 | 500 |
| Tensile (Kpsi) | 19.2 | 19.8 | 17.8 | 18.1 | 18.2 | 17.3 |
| Unnotched IZOD (ft-lb/in) | 11.8 | 9.83 | 9.02 | 7.94 | 9.04 | 6.85 |
| Notched IZOD (ft-lb/in) | 1.93 | 2.16 | 1.91 | 2.02 | 2.07 | 1.93 |
| FLEX (Kpsi) | 27.4 | 31.3 | 27.7 | 27.4 | 27.4 | 25.0 |
| % Glass | 24.7 | 25.4 | 24.5 | 24.7 | 25.0 | 24.9 |

The above data shows that glass sized with the size of this invention compares favorably with the commercially available sample and has greater mechanical strength than the control samples. Tensile and flex were especially improved over the control samples. The molded specimens also had a significant improvement in color when compared to the control samples.

I claim:

1. An aqueous size composition for glass fibers comprising:
    a compound with N-Methylol function or N—CH$_2$—OR function or both, with R being an alkyl radical;
    carboxyl modified polyhydroxy ether; and
    epoxy silane coupling agent.

2. An aqueous size composition for glass fibers comprising:
    melamine formaldehyde, urea formaldehyde or amino formaldehyde resin;
    phenoxy resin; and
    epoxy silane coupling agents having an oxirane group linked through non-hydrolyzable bonds to a silicon atom.

3. An aqueous size composition for glass fibers comprising:
    melamine formaldehyde resin;
    water dispersible phenoxy resin;
    epoxy silane coupling agents having lower alkyl groups;
    lubricant; and
    acid.

4. An aqueous size composition for glass fibers comprising:
    methylated, melamine formaldehyde resin;
    water dispersible phenoxy resin;
    gamma-glycidoxypropyltrimethoxy silane;
    polyoxyethylene sorbitan lubricant;
    ammonium chloride;
    acetic acid; and
    water 5. A size composition according to claim 1 comprising by weight percent:

|  | Weight Percent |
| --- | --- |
| N-methylol compound | 0.5–14.0 |
| polyhydroxy ether | 1.0–33.0 |
| coupling agent | 0.1–3.5 |
| water | balance |

6. A size composition according to claim 2 comprising by weight percent:

|                  | Weight Percent |
| ---              | ---            |
| formaldehyde resin | 1.5-5.5      |
| phenoxy resin    | 3.5-13.5       |
| coupling agent   | 0.4-1.5        |
| water            | balance        |

7. A size composition according to claim 4 comprising by weight percent:

|                    | Weight Percent |
| ---                | ---            |
| formaldehyde resin | 4.6            |
| phenoxy resin      | 11.4           |
| silane             | 1.2            |
| lubricant          | 0.07           |
| Chloride           | 0.12           |
| acid               | 0.025          |
| water              | balance        |

8. Glass fibers having a size coating comprising the dried residue of the aqueous composition of claim 1.

9. Glass fibers having a size coating comprising the dried residue of the aqueous composition of claim 4.

10. Glass fibers according to claim 8 wherein the fibers are chopped glass fibers.

11. Glass fibers according to claim 9 wherein the fibers are chopped glass fibers.

12. Glass fiber reinforced thermoplastics wherein the glass fibers are fibers according to claim 8.

13. Glass fiber reinforced thermoplastics wherein the glass fibers are chopped fibers according to claim 10.

14. Glass fiber reinforced acetal composites wherein the glass fibers are fibers according to claim 9.

15. Glass fiber reinforced acetal composites wherein the glass fibers are chopped glass fibers according to claim 11.

* * * * *